(12) United States Patent
Snyder (10) Patent No.: US 9,901,856 B2
(45) Date of Patent: Feb. 27, 2018

(54) FABRIC FILTER LOUVER ASSEMBLY

(71) Applicant: The Babcock & Wilcox Company, Barberton, OH (US)

(72) Inventor: Robert E Snyder, Uniontown, OH (US)

(73) Assignee: The Babcock & Wilcox Company, Barberton, OH (US)

(*) Notice: Subject to any disclaimer, the term of this patent is extended or adjusted under 35 U.S.C. 154(b) by 0 days.

(21) Appl. No.: 15/053,209

(22) Filed: Feb. 25, 2016

(65) Prior Publication Data

US 2017/0246575 A1    Aug. 31, 2017

(51) Int. Cl.
*B01D 46/00* (2006.01)
*B01D 46/10* (2006.01)
*B01D 46/44* (2006.01)

(52) U.S. Cl.
CPC ..... *B01D 46/0041* (2013.01); *B01D 46/0005* (2013.01); *B01D 46/10* (2013.01); *B01D 46/44* (2013.01)

(58) Field of Classification Search
CPC .............. B01D 46/00; B01D 46/0041; B01D 46/0005; B01D 46/10; B01D 46/44
USPC .................. 55/302, 341.1–341.7; 95/1, 20
See application file for complete search history.

(56) References Cited

U.S. PATENT DOCUMENTS

| | | | | |
|---|---|---|---|---|
| 4,523,931 A | * | 6/1985 | Miller | B01D 46/02 55/309.1 |
| 6,451,091 B1 | * | 9/2002 | Avina | B01D 46/44 55/341.1 |
| 2004/0261376 A1 | * | 12/2004 | Morgan | B01D 46/0068 55/302 |

* cited by examiner

*Primary Examiner* — T. Bennett McKenzie
(74) *Attorney, Agent, or Firm* — Michael J. Seymour (57) ABSTRACT

A fabric filter for separating particulate matter from a gas stream includes a filter compartment and an inlet opening for delivering at least a portion of the gas stream to the filter compartment. The fabric filter further includes one or more filter elements within the filter compartment and a louver assembly for providing access for the at least a portion of the gas stream to said filter compartment. The louver assembly has a first louver associated with the inlet opening and movable between a first-louver-first position and a first-louver-second position. The louver assembly has a second louver associated with the inlet opening and movable between a second-louver-first position and a second-louver-second position. The first louver and the second louver are movable independent of each other to facilitate or restrict fluid communication through said opening.

19 Claims, 5 Drawing Sheets

FABRIC FILTER LOUVER ASSEMBLY

FIELD

The present invention relates generally to a louver assembly, and, more particularly, to a louver assembly for a fabric filter.

BACKGROUND

Fabric filters (also known as baghouses) are generally employed to separate particulate matter from gas streams. For example, fabric filters can be used to separate fly ash and other undesirable particulate matter from a boiler flue gas stream. The filtration of the particulate matter from particulate-laden gas is carried out using filter elements that comprise a porous fabric material and are suspended within one or more compartments of the fabric filter. The gas stream is directed into the fabric filter through an inlet manifold and then passes through the porous fabric material of the filter bags before exiting the fabric filter through an outlet manifold. As the gas stream passes through the porous fabric material of a filter element, the particulate material will separate from the gas stream and be collected within a hopper of the fabric filter located below the filter element.

SUMMARY

In accordance with a first aspect, a fabric filter for separating particulate matter from a gas stream includes a filter compartment and an inlet opening for delivering at least a portion of the gas stream to the filter compartment. The fabric filter further includes one or more filter elements within the filter compartment and a louver assembly for providing access for the at least a portion of the gas stream to said filter compartment. The louver assembly has a first louver associated with the inlet opening and movable between a first-louver-first position and a first-louver-second position. The louver assembly has a second louver associated with the inlet opening and movable between a second-louver-first position and a second-louver-second position. The first louver and the second louver are movable independent of each other to facilitate or restrict fluid communication through said opening.

In accordance with a second aspect, an operating assembly is provided for a louver assembly of a fabric filter that includes a first louver associated with an inlet opening of the fabric filter that is movable between a first-louver-first position and a first-louver-second position and a second louver associated with the inlet opening that is movable between a second-louver-first position and a second-louver-second position. The operating assembly has a drive assembly that is configured to be placed in operable communication with the first louver or the second louver and is operable to move the first louver or the second louver independently of the other.

In accordance with a third aspect a method is provided of operating a louver assembly for a fabric filter that includes a first louver associated with an inlet opening of the fabric filter that is movable between a first-louver-first position and a first-louver-second position and a second louver associated with the inlet opening that is movable between a second-louver-first position and a second-louver-second position. The method comprises moving the first louver independently of the second louver in order to adjust a proportion of open area of said opening that is open to fluid communication therethrough.

These and other non-limiting aspects of the disclosure are more particularly described below. For a better understanding of the embodiments disclosed herein, reference is made to the accompanying drawings and description forming a part of this disclosure.

BRIEF DESCRIPTION OF THE DRAWINGS

The embodiments disclosed herein may take form in various components and arrangements of components, and in various process operations and arrangements of process operations. The drawings are only for purposes of illustrating preferred embodiments and are not to be construed as limiting. The foregoing and other aspects will become apparent to those skilled in the art to which the present examples relate upon reading the following description with reference to the accompanying drawings, in which.

DETAILED DESCRIPTION

A more complete understanding of the components, processes, systems, methods and apparatuses disclosed herein can be obtained by reference to the accompanying drawings. The figures are merely schematic representations based on convenience and the ease of demonstrating the present disclosure, and is, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4."

To the extent that explanations of certain terminology or principles of the chemical looping arts, systems, processes, and related arts may be necessary to understand the present disclosure, the reader is referred to Steam/its generation and use, 40th Edition, Stultz and Kitto, Eds., Copyright 1992, The Babcock & Wilcox Company, and to Steam/its generation and use, 41st Edition, Kitto and Stultz, Eds., Copyright 2005, The Babcock & Wilcox Company, and Steam/its generation and use, 42nd Edition, G. L. Tomei, Ed., Copyright 2015, The Babcock & Wilcox Company, the texts of which are hereby incorporated by reference as though fully set forth herein.

Figure 1:
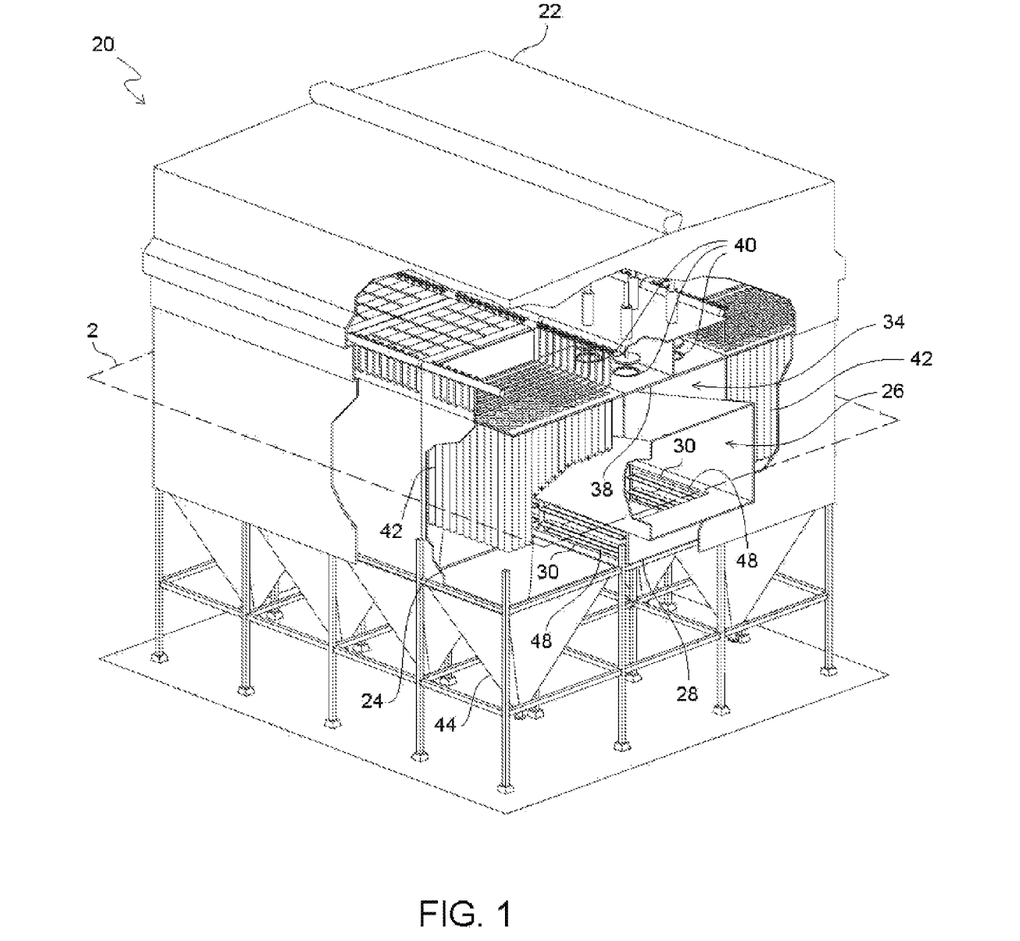
FIG. 1 is a perspective view of an example fabric filter partially broken away to show interior details.
Figure 2:
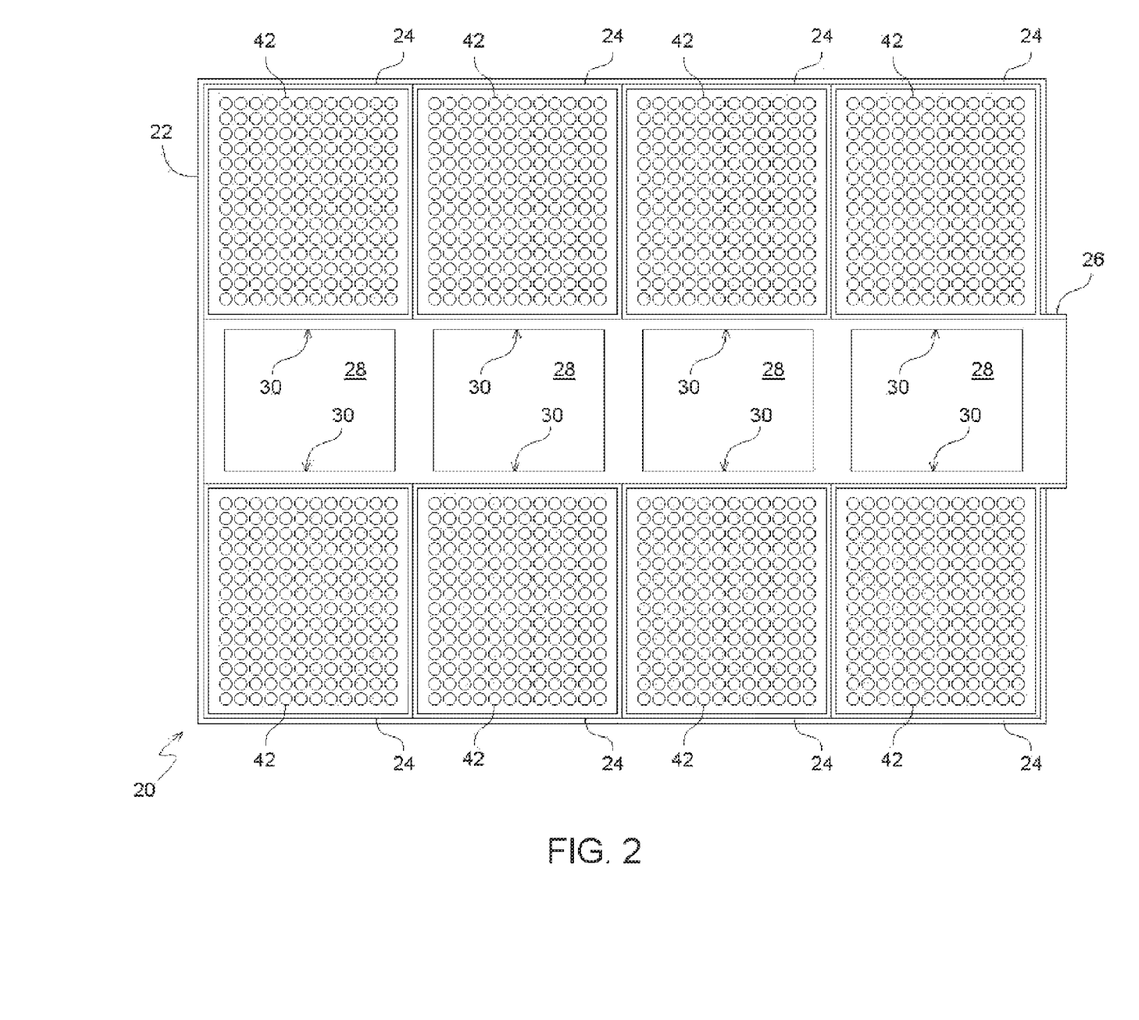
FIG. 2 is a horizontal cross-section view of the fabric filter taken through plane 2 in FIG. 1.

Referring to FIGS. 1 & 2, an example fabric filter (baghouse) 20 is shown that can be used to separate particulate matter from a gas stream. For example, the fabric filter 20 can be used with a boiler (not shown) that burns coal or other fossil fuels to produce steam for an electric generator. A by-product of the combustion process is flue gas, which can be exhausted from the boiler and released into the atmosphere. Most fossil fuels contain some quantity of non-combustibles that form particulate (e.g., ash) in the flue gas that needs to be collected before releasing the flue gas into the atmosphere. Accordingly, the example fabric filter 20 can be used to separate the particulate from the flue gas of the boiler before releasing the gas into the atmosphere.

The fabric filter 20 comprises a housing 22 and one or more filter compartments 24 provided within the housing 22. The fabric filter 20 further comprises an inlet manifold 26 and one or more inlet portions 28 in communication with the manifold 26, each having one or more inlet openings 30 for providing fluid communication between respective filter compartments 24 and the inlet manifold 26, as illustrated schematically in FIG. 2. Each inlet opening 30 corresponds to a different filter compartment 24, though in some examples, multiple inlet openings 30 may correspond to the same filter compartment 24. The inlet portions 28 can form part of the inlet manifold 26 and/or the filter compartments 24 or the inlet portions 28 can be separate structures that are provided between the filter compartments 24 and the inlet manifold 26.

The example fabric filter 20 further comprises an outlet manifold 34 and one or more outlet portions 38 having one or more outlet openings 40 for providing fluid communication between the filter compartments 24 and the outlet manifold 34. Two outlet openings 40 correspond to each filter compartment 24 in the illustrated embodiment, though in some examples, one or more than two outlet openings 40 may correspond to each filter compartment 24. The outlet portions 38 can form part of the outlet manifold 34 and/or the respective filter compartments 24 or the outlet portions 38 can be separate structures that are provided between the filter compartments 24 and the outlet manifold 34.

The fabric filter 20 further comprises a plurality of filter elements 42 that each comprise a porous fabric material. The porous fabric material for each filter element 42 is shaped as a cylinder in the illustrated embodiment having one closed end and one open end to form a filter bag, though other shapes are possible. Multiple filter elements 42 can be provided within each filter compartment 24.

The fabric filter 20 is configured such that a gas stream from a source (e.g., a boiler) can be received by the inlet manifold 26 and delivered to one of the filter compartments 24 through its corresponding inlet opening 30. The gas stream can then pass through the filter compartment 24 and be expelled therefrom via its corresponding outlet openings 40 into the outlet manifold 34. The outlet manifold 34 can then direct and expel the gas stream into the atmosphere or some other structure downstream from the fabric filter 20. In the present example, the outlet manifold 34 directs and expels the gas stream out a rear side of the fabric filter 20, though other sides are possible in other embodiments.

The filter elements 42 for each filter compartment 24 are configured such that as the gas stream passes through the filter compartment 24 from its corresponding inlet opening 30 to its corresponding outlet openings 40, the gas stream will pass through the porous fabric material of one of its filter elements 42. As the gas stream passes through the porous fabric material, particulate within the gas stream can collect on the porous fabric material, thereby separating from the gas stream as the gas stream continues to travel through and out of the filter compartment 24. The particulate matter will either remain on the porous fabric material or fall down from the porous fabric material into a hopper 44 of the filter compartment 24 provided below the filter elements 42.

Figure 3:
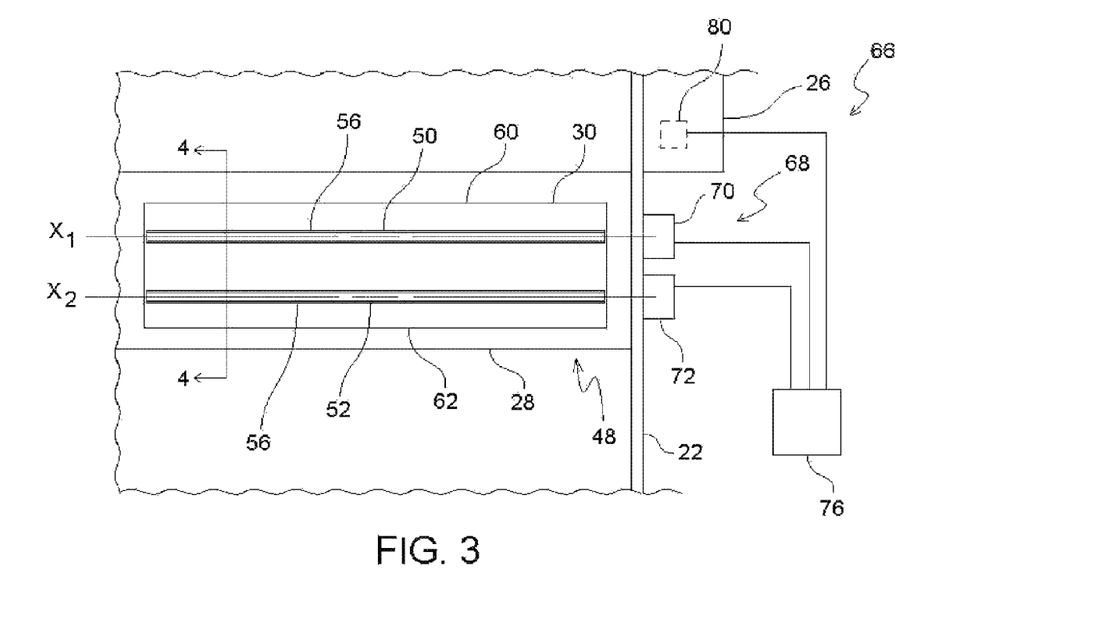
FIG. 3 is a view of an example louver assembly of the fabric filter in one state.
Figure 4:
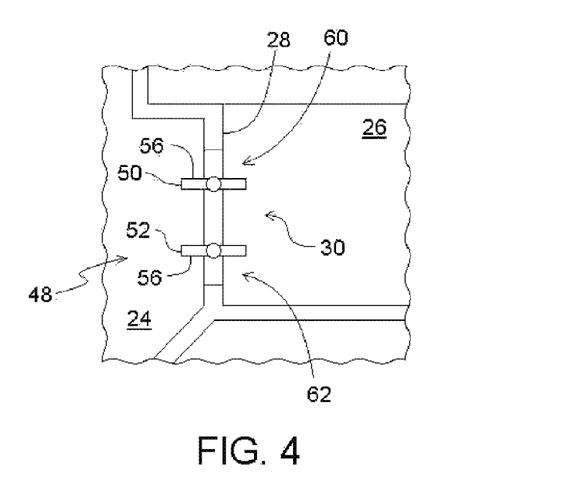
FIG. 4 is a cross-section view of the louver assembly taken along line 4-4 in FIG. 3.
Figure 5:
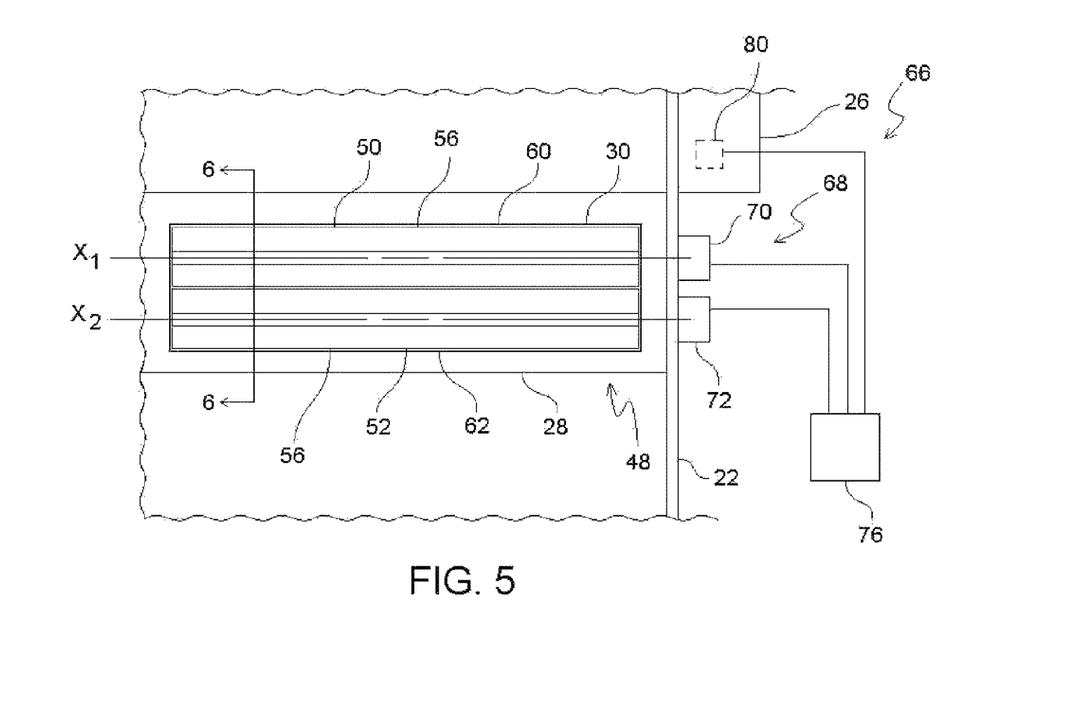
FIG. 5 is a view of the louver assembly of FIG. 3, but in another state.
Figure 6:
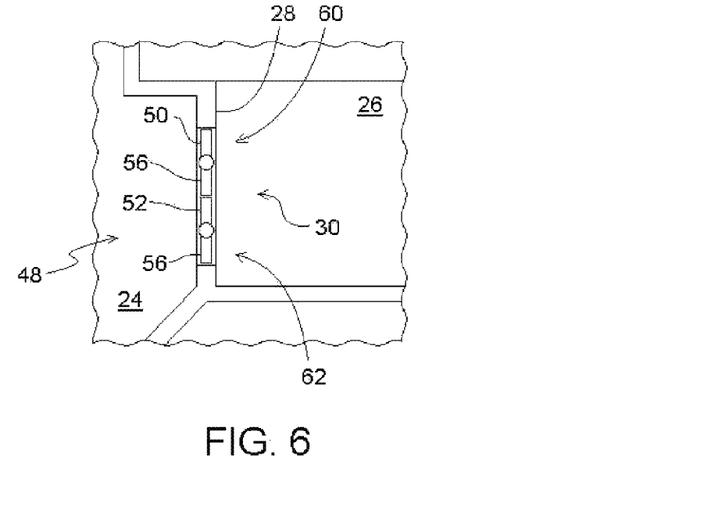
FIG. 6 is a cross-section view of the louver assembly taken along line 6-6 in FIG. 5.

To assist in controlling the flow of the gas stream into the filter compartments 24, the fabric filter 20 can have one or more louver assemblies 48 corresponding to each inlet portion 28 to control or regulate the flow of flue gas therethrough. As shown in FIGS. 3-6, each louver assembly 48 can have a first louver 50 and a second louver 52 that can both be associated with its corresponding inlet opening 30. For example, the first louver 50 can be provided within the inlet opening 30 and movably mounted to the inlet portion 28 such that the first louver 50 is movable between a first-louver-first position (e.g., an open position, as shown in FIGS. 3 & 4) and a first-louver-second position (e.g., a closed position, as shown in FIGS. 5 & 6). Similarly, the second louver 52 can be provided within the inlet opening 30 and movably mounted to the inlet portion 28 such that the second louver 52 is movable between a second-louver-first position (e.g., an open position, as shown in FIGS. 3 & 4) and a second-louver-second position (e.g., a closed position, as shown in FIGS. 5 & 6). Each louver assembly 48 can have additional louvers that are also similarly mounted within its corresponding inlet opening 30.

To move the first and second louvers 50, 52 between positions, the first and second louvers 50, 52 can be respectively rotatable about a first axis $X_1$ and a second axis $X_2$, though other motions are possible in other examples such as linear or non-linear actuation or in-plane motion. The first and second axes $X_1$, $X_2$ are both substantially horizontal/parallel and vertically spaced from each other. However, in some examples, the first and second axes $X_1$, $X_2$ may be non-parallel and in some examples, one or both of the first and second axes $X_1$, $X_2$ may have a non-horizontal orientation.

Each of the first and second louvers 50, 52 has a panel member 56 that extends longitudinally along its respective axis $X_1$, $X_2$. As shown in FIGS. 3 & 4, when the first louver 50 is in its first-louver-first position, its panel member 56 will be substantially horizontal, thereby opening a top portion 60 of the inlet opening 30. Similarly, when the second louver 52 is in its second-louver-first position, its panel member 56 will be substantially horizontal, thereby opening a bottom portion 62 of the inlet opening 30. Meanwhile, as shown in FIGS. 5 & 6, when the first louver 50 is in its first-louver-second position, its panel member 56 will be rotated about 90° to a substantially vertical orientation, thereby closing the top portion 60 of the inlet opening 30.

Similarly, when the second louver 52 is in its second-louver-second position, its panel member 56 will be rotated about 90° to a substantially vertical orientation, thereby closing the bottom portion 62 of the inlet opening 30. However, it should be appreciated that the panel members 56 of the first or second louvers 50, 52 can have different orientations or different angles of displacement between positions.

Preferably, the first and second louvers 50, 52 are movable independent of each other. In other words, movement of one of the first and second louvers 50, 52 does not necessitate or cause movement of the other. However, it is to be appreciated that the first and second louvers 50, 52 may still be moved simultaneously even though simultaneous movement is not necessary or necessarily caused by movement of one of the first and second louvers 50, 52.

Figure 7:
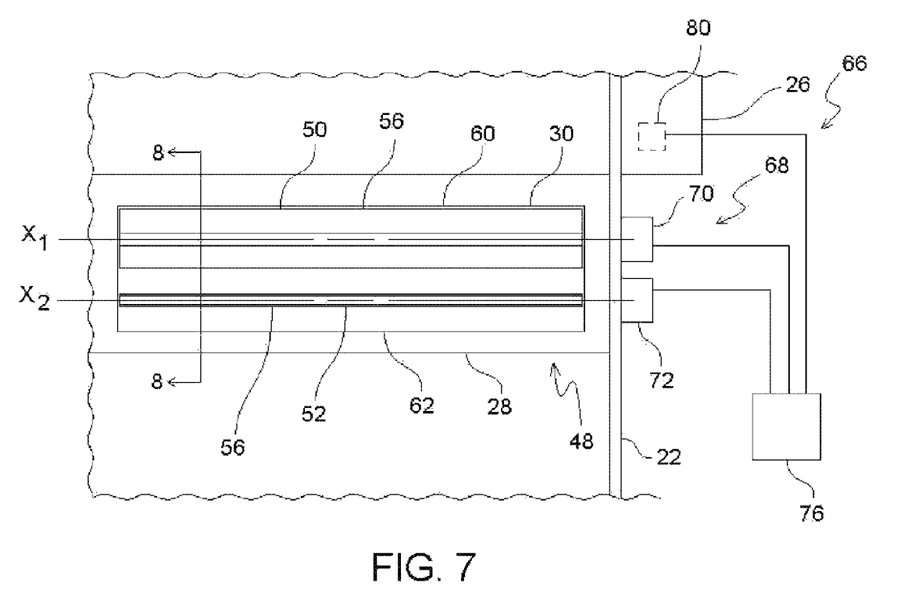
FIG. 7 is a view of the louver assembly of FIG. 3, in yet another state.
Figure 8:
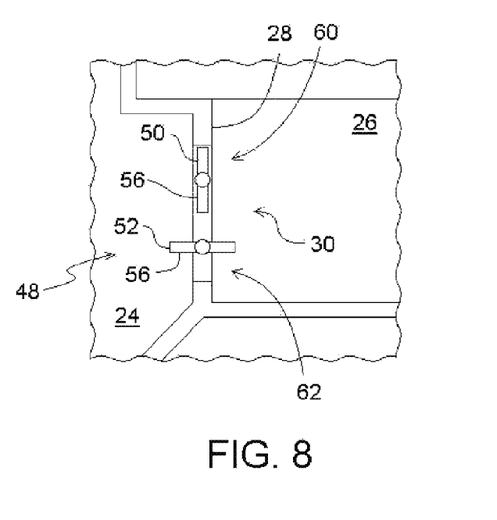
FIG. 8 is a cross-section view of the louver assembly taken along line 8-8 in FIG. 7.

Because the first and second louvers 50, 52 are movable independent of each other, the first and second louvers 50, 52 can be moved in various different ways to achieve different configurations for the louver assembly 48 in order to facilitate or restrict fluid communication through the associated inlet opening 30 in order to regulate or affect the flow of flue gas therethrough. In particular, the first and second louvers 50, 52 can be moved in order to adjust a proportion of the area of the inlet opening 30 that is open to fluid communication therethrough. The first and second louvers 50, 52 can be moved independently 50, 52 in response to a gas-flow demand of gas through the inlet opening 30 or a cleaning or repair operation, either manually or automatically. For example, the louver assembly 48 can be altered between a first state, a second state, and a third state. In the first state, the first louver 50 is in the first-louver-first position, thereby opening the top portion 60 of the inlet opening 30, while the second louver 52 is in the second-louver-first position, thereby opening the bottom portion 62 of the inlet opening, as shown in FIGS. 3 & 4. In the second state, the first louver 50 is in the first-louver-second position, thereby closing the top portion 60 of the inlet opening 30, while the second louver 52 is in the second-louver-first position, thereby opening only the bottom portion 62 of the inlet opening 30, as shown in FIGS. 7 & 8. In the third state, the first louver 50 is in the first-louver-second position, thereby closing the top portion 60 of the inlet opening 30, while the second louver 52 is in the second-louver-second position, thereby closing the bottom portion 62 of the inlet opening, as shown in FIGS. 5 & 6.

When large loads (i.e., large volumetric flow rates) of gas are passing through the inlet opening 30, the louver assembly 48 can be altered to the first state wherein both the top and bottom portions 60, 62 of the inlet opening 30 are open to provide the largest area opening for the gas to pass through. The first state therefore can correspond to a relatively high gas-flow demand through the inlet opening 30. However, when relatively smaller loads are passing through the inlet opening 30, such a large area can result in a low velocity of gas passing through the inlet opening 30, which can cause particulate matter within the gas to become dis-entrained from the slower moving gas stream and settle within the inlet portion 28 and/or inlet manifold 26. This can result in clogging of the inlet portion 28 and/or inlet manifold 26. To avoid this problem, the louver assembly 48 can be altered to the second state, which corresponds to a relatively lower gas-flow demand through the inlet opening 30. In the second state, the top portion 60 of the inlet opening 30 will be closed while bottom portion 62 is open, thereby decreasing the area for the gas to pass through to produce a sufficiently high velocity of the gas stream passing through the inlet opening 30. The high velocity can help keep particulate matter entrained in the gas stream until the gas stream reaches the filter elements 42. Moreover, because the bottom portion 62 of the inlet opening 30 is open while the top portion 60 is closed, the gas stream will be directed along a lower portion of the inlet portion 28, which can help pick up any solids that may have previously been deposited along the bottom of the inlet portion 28.

In some instances, it may be desired to isolate a filter compartment 24 from the inlet manifold 26. For example, it may be desired to isolate a filter compartment 24 from the inlet manifold 26 during repair or cleaning of the filter compartment 24. In such cases, the associated louver assembly 48 can be altered to the third state, wherein both the top portion 60 and the bottom portion 62 of the inlet opening 30 are both closed to isolate the filter compartment 24 from the inlet manifold 26.

In some examples, the louver assembly 48 includes an operating assembly 66 having a drive assembly 68 that is configured to be placed in operative communication with the first louver 50 and/or second louver 52 and is operable to move the first louver 50 and/or second louver 52 independently of the other. For instance, the drive assembly 68 can have a first drive unit 70 that is operable to move the first louver 50 independently of the second louver 52 and/or a second drive unit 72 that is operable to move the second louver 52 independently of the first louver 50. Alternatively, the operating assembly 66 can have a single drive unit that is operable to move one or both the first and second louvers 50, 52, either simultaneously or individually. The drive unit(s) of the drive assembly 68 may each include, e.g., a motor, a handle, a drive chain, or some other means that can be operable to move the first and/or second louvers 50, 52.

In some examples, the operating assembly 66 has a controller 76 that is configured to operate the drive assembly 68 to move its first and second louvers 50, 52 and selectively alter the louver assembly 48 between states. For instance, the controller 76 can be configured to operate motors of the first and second drive units 70, 72 to move the corresponding first and second louvers 50, 52. The controller 76 can be configured to operate the first and second drive units 70, 72 either automatically as part of a control sequence or based on inputs that are manually provided.

In some instances, the controller 76 can be configured to operate the drive assembly 68 to selectively alter the louver assembly 48 between the first state and the second state based on a load parameter. For instance, the operating assembly 66 can include a sensor 80 configured to detect the load parameter and send a signal to the controller 76 based on the load parameter. The load parameter can be a volumetric or mass flow rate of gas passing through a portion of the fabric filter 20, an electric output generated by the boiler and steam generator, an operating speed of a fan being used to draw gas through the fabric filter 20, or any other parameter that can indicate a gas-flow demand that may be passing through the inlet opening 30. The sensor 80 can be configured to detect the load parameter and send a signal to the controller 76 that indicates a condition of the load parameter. For example, in some instances, the load parameter may include a first condition wherein the load parameter is above a predetermined value Y and classified as a high-load condition. The sensor 80 can be configured to detect the load parameter and send a signal to the controller 76 that indicates when the load parameter is at the first condition. In response to receiving the signal, the controller 76 can be configured to operate the drive assembly 68 to alter the louver assembly 48 to the first state wherein both the top portion 60 and bottom portion 62 of the inlet opening 30 are open. Thus, the louver assembly 48 can be altered to the first state when the load parameter is at the high-load condition. In other instances, the load parameter may include a second condition wherein the load parameter is below the predetermined value Y and classified as a low-load condition. The sensor 80 can be configured to detect the load parameter and send a signal to the controller 76 that indicates when the load parameter is at the second condition. In response to receiving the signal, the controller 76 can be configured to operate the drive assembly 68 to alter the louver assembly 48 to the second state wherein the top portion 60 of the inlet opening 30 is closed and the bottom portion 62 is open. Thus, the louver assembly 48 can be altered to the second state when the load parameter is at the low-load condition.

The controller 76 can be configured to operate the drive assembly 68 to selectively alter the louver assembly 48 between the first, second, and third states based on an operating condition. For example, when it is desired to isolate the corresponding filter compartment 24 of the louver assembly 48 from the inlet manifold 26 for an operation such as cleaning, a signal can be sent to the controller 76 indicating a cleaning operating condition. The signal can be sent via a user interface, a cleaning sensor, or some other means capable of sending a signal to the controller 76 to indicate a cleaning operating condition. In response to receiving the signal, the controller 76 can be configured to operate the drive assembly 68 to alter the louver assembly 48 to the third state wherein both the top portion 60 and bottom portion 62 of the inlet opening 30 are closed, thereby isolating the filter compartment 24 for cleaning. When it is desired to open one or both of the first and second louvers 50, 52 of the louver assembly 48 for a filtering operation, a signal can be sent to the controller 76 indicating a filtering operating condition. The signal can be sent via a user interface, a cleaning sensor, or some other means capable of sending a signal to the controller 76 to indicate that cleaning is over and the filter compartment 24 is ready for a filtering operation. In response to receiving the signal, the controller 76 can be configured to operate the drive assembly 68 to alter the louver assembly 48 between the first and second states based on a load parameter, as described above.

The invention has been described with reference to example embodiments described above. While various aspects and embodiments have been disclosed herein, other aspects, embodiments, modifications and alterations will be apparent to those skilled in the art upon reading and understanding the preceding detailed description. The various aspects and embodiments disclosed herein are for purposes of illustration and are not intended to be limiting. It is intended that the present disclosure be construed as including all such aspects, embodiments, modifications and alterations insofar as they come within the scope of the appended claims or the equivalents thereof.

What is claimed is:

1. A fabric filter for separating particulate matter from a gas stream comprising:
   a plurality of filter compartments;
   wherein each filter compartment comprises:
      an inlet opening for delivering at least a portion of the gas stream to the filter compartment;
      one or more filter elements within the filter compartment; and
      a louver assembly for providing access for the at least a portion of the gas stream to said filter compartment, the louver assembly comprising:
         a first louver associated with the inlet opening and movable between a first-louver-first position and a first-louver-second position, and
         a second louver associated with the inlet opening and movable between a second-louver-first position and a second-louver-second position,
         wherein the first louver and the second louver are movable independent of each other to facilitate or restrict fluid communication through said inlet opening;
      a drive assembly that is operable to move the first louver or the second louver independently of the other; and
      a controller configured to operate the drive assembly to selectively alter the louver assembly between a first state and a second state,
      wherein in the first state the first louver is in the first-louver-first position and the second louver is in the second-louver-first position, thus substantially opening both first and second portions of the inlet opening, and
      wherein in the second state the first louver is in the first-louver-second position and the second louver is in the second-louver-first position, thus substantially closing the first portion of the inlet opening and substantially opening the second portion of the inlet opening.

2. The fabric filter according to claim 1, wherein the first louver is rotatable about a first axis and the second louver is rotatable about a second axis.

3. The fabric filter according to claim 2, wherein the first axis and second axis are substantially parallel and are spaced from each other.

4. The fabric filter according to claim 2, wherein in the first-louver-first position the first louver is substantially horizontal and in the first-louver-second position the first louver is substantially vertical.

5. The fabric filter according to claim 4, wherein in the second-louver-first position the second louver is substantially horizontal and in the second-louver-second position the second louver is substantially vertical.

6. The fabric filter according to claim 1, wherein the drive assembly is operable to move the first louver and the second louver independently of each other.

7. The fabric filter according to claim 1, wherein the controller is configured to operate the drive assembly to selectively alter the louver assembly between the first state, the second state, and a third state,
   wherein in the third state, the first louver is in the first-louver-second position and the second louver is in the second-louver-second position, thus substantially closing both the first and second portions of the inlet opening.

8. The fabric filter according to claim 1, wherein the controller is configured to operate the drive assembly to selectively alter the louver assembly between the first state and the second state based on a load parameter.

9. The fabric filter according to claim 8, further comprising a sensor configured to detect the load parameter and send a signal to the controller based on the load parameter.

10. The fabric filter according to claim 1, wherein the one or more filter elements each comprises a porous fabric material and is configured such that as the portion of the gas stream passes through the filter compartment from the inlet opening to an outlet opening of the filter compartment, the portion of the gas stream passes through the porous fabric material of one of the one or more filter elements.

11. An operating assembly for a plurality of louver assemblies of a fabric filter, the fabric filter comprising a plurality of filter compartments wherein each filter compartment comprises an inlet opening and a louver assembly, and wherein the louver assembly comprises a first louver associated with the inlet opening of the filter compartment that is movable between a first-louver-first position and a first-louver-second position and a second louver associated with the inlet opening that is movable between a second-louver-first position and a second-louver-second position, the operating assembly comprising:

a drive assembly that is configured to be placed in operative communication with the first louver or the second louver and is operable to move the first louver or the second louver independently of the other in order to facilitate or restrict fluid communication through said inlet opening; and a controller configured to operate the drive assembly to selectively alter the louver assembly between a first state and a second state, wherein in the first state the first louver is in the first-louver-first position and the second louver is in the second-louver-first position, thus substantially opening both first and second portions of the inlet opening, and wherein in the second state the first louver is in the first-louver-second position and the second louver is in the second-louver-first position, thus substantially closing the first portion of the inlet opening and substantially opening the second portion of the inlet opening.

12. The operating assembly according to claim 11, the drive assembly being operable to move the first louver and the second louver independently of each other.

13. The operating assembly according to claim 11, wherein the controller is configured to operate the drive assembly to selectively alter the louver assembly between the first state, the second state, and a third state, wherein in the third state the first louver is in the first-louver-second position and the second louver is in the second-louver-second position, thus substantially closing both the first and second portions of the inlet opening.

14. The operating assembly according to claim 11, wherein the controller is configured to operate the drive assembly to selectively alter the louver assembly between the first state and the second state based on a load parameter.

15. The operating assembly according to claim 14, further comprising a sensor configured to detect the load parameter and send a signal to the controller based on the load parameter.

16. The operating assembly according to claim 14, wherein the load parameter comprises a high load condition and the operating assembly comprises a sensor that is configured to detect the load parameter and send a signal that indicates when the load parameter is at the high load condition.

17. The operating assembly according to claim 16, wherein in response to receiving the signal the controller is configured to operate the drive assembly to alter the louver assembly to the first state.

18. The operating assembly according to claim 14, wherein the load parameter comprises a low load condition and the operating assembly comprises a sensor that is configured to detect the load parameter and send a signal that indicates when the load parameter is at the low load condition.

19. The operating assembly according to claim 18, wherein in response to receiving the signal the controller is configured to operate the drive assembly to alter the louver assembly to the second state.

* * * * *